US012631497B2

(12) United States Patent
Fortunato et al.

(10) Patent No.: US 12,631,497 B2
(45) Date of Patent: May 19, 2026

(54) MEASURING INSERT FOR SENSING TEMPERATURE

(71) Applicant: Endress+Hauser Wetzer GmbH+Co. KG, Nesselwang (DE)

(72) Inventors: Gianluca Fortunato, Milan (IT); Michele Pietroni, San Donato (IT); Davide Eralti, Vedano al Lambro (IT); Davide Tagliabue, Paderno Dugnano (IT); Andrea Micieli, Vignate (IT); Markus Mornhinweg, Dießen (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 696 days.

(21) Appl. No.: 18/054,290

(22) Filed: Nov. 10, 2022

(65) Prior Publication Data

US 2023/0143794 A1     May 11, 2023

(30) Foreign Application Priority Data

Nov. 10, 2021    (EP) ..................................... 21207419

(51) Int. Cl.
| | |
|---|---|
| *G01K 1/08* | (2021.01) |
| *G01K 1/14* | (2021.01) |
| *G01K 1/16* | (2006.01) |
| *G01K 7/18* | (2006.01) |

(52) U.S. Cl.
CPC ................. *G01K 1/08* (2013.01); *G01K 1/14* (2013.01); *G01K 1/16* (2013.01); *G01K 7/18* (2013.01)

(58) Field of Classification Search
CPC .. G01K 1/08; G01K 1/14; G01K 1/16; G01K 7/18

USPC ................................................... 374/208, 148
See application file for complete search history.

(56) References Cited

U.S. PATENT DOCUMENTS

| | | | |
|---|---|---|---|
| 9,091,599 B2 * | 7/2015 | Lukach, Jr. .............. | G01K 1/16 |
| 2017/0370782 A1 | 12/2017 | Pecquet et al. | |
| 2021/0270679 A1 | 9/2021 | Peuker et al. | |
| 2021/0325219 A1 | 10/2021 | Strom | |

(Continued)

FOREIGN PATENT DOCUMENTS

| | | |
|---|---|---|
| CN | 104048773 A1 | 9/2014 |
| DE | 2533632 A1 | 2/1977 |
| DE | 102013114140 A1 | 6/2015 |

(Continued)

OTHER PUBLICATIONS

Translation of DE2533632A1.*

*Primary Examiner* — Mirellys Jagan
(74) *Attorney, Agent, or Firm* — Christopher R. Powers; Endress+Hauser (USA) Holding, Inc.

(57) ABSTRACT

The present disclosure relates to a measuring insert for insertion into a protective tube for determining and/or monitoring a temperature of a medium in a vessel or pipe, which protective tube at least partially protrudes into an inner volume of the vessel or pipe, the measuring insert including: an elongated tube; a temperature sensor arranged inside an end region of the measuring insert; and a coupling element connected to the elongated tube in the end region in which the temperature sensor is arranged, which coupling element is embodied and/or dimensioned so as to serve for fixing the measuring insert inside the protective tube in a state in which the measuring insert is introduced into the protective tube.

11 Claims, 4 Drawing Sheets

(56)          References Cited

U.S. PATENT DOCUMENTS

2023/0147830 A1 *   5/2023   Fortunato  ............... G01K 1/14
                                                                374/208

FOREIGN PATENT DOCUMENTS

| | | | |
|---|---|---|---|
| DE | 102014101968 A1 | 8/2015 | |
| DE | 102018111167 A1 | 11/2019 | |
| DE | 102019103117 A1 | 8/2020 | |
| EP | 3264059 A1 | 1/2018 | |
| EP | 3112830 B1 * | 8/2018 | ............. G01K 1/14 |
| JP | 2015152336 A * | 8/2015 | |
| WO | 2014158393 A1 | 10/2014 | |

* cited by examiner

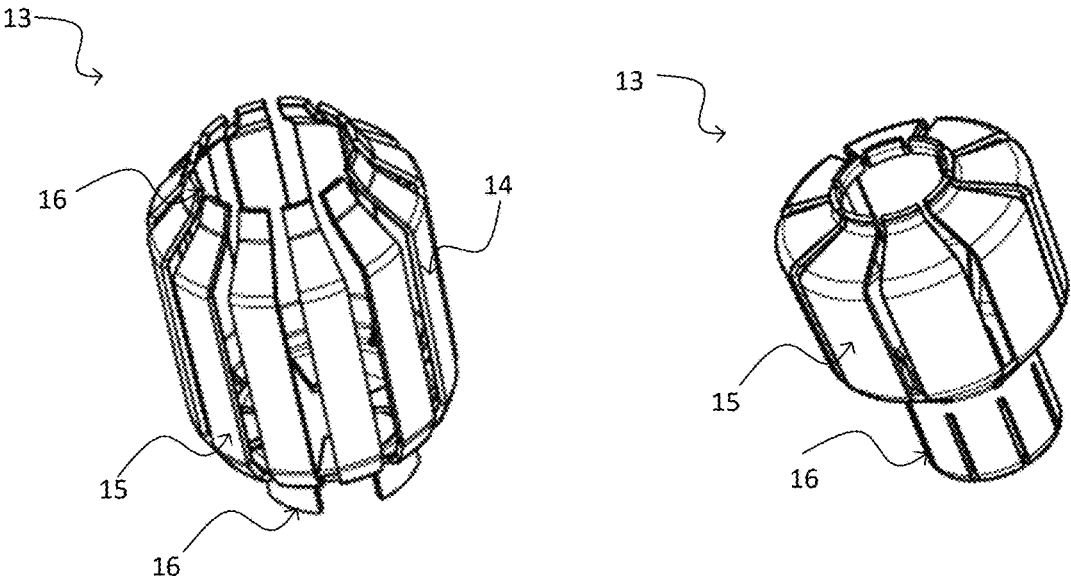
Fig. 4a
Fig. 4b
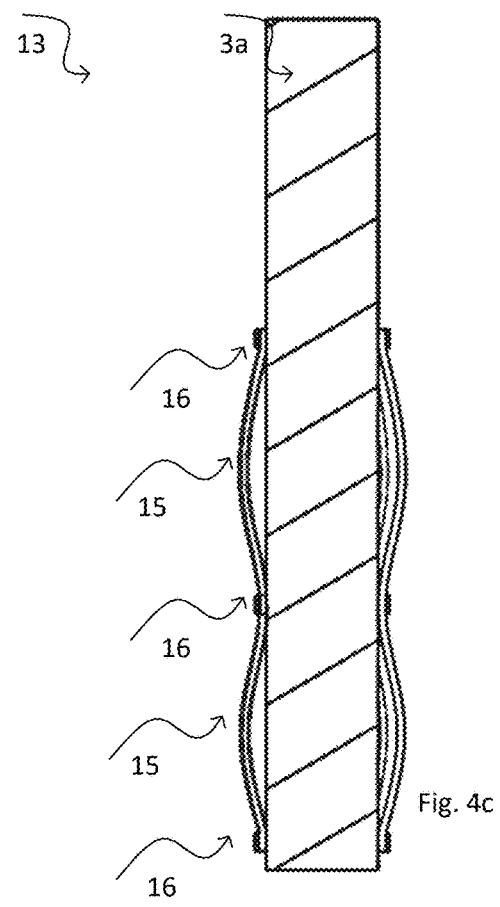
Fig. 4c

MEASURING INSERT FOR SENSING TEMPERATURE

The present application is related to and claims the priority benefit of European Patent Application No. 21207419.9, filed on Nov. 10, 2021, the entire contents of which are incorporated herein by reference.

TECHNICAL FIELD

The present disclosure generally relates to measuring inserts for determining and/or monitoring a temperature of a medium in a vessel or pipe for insertion into a protective tube. The present disclosure further relates to thermometers for determining and/or monitoring a temperature of a medium in a vessel or pipe including such measuring inserts.

BACKGROUND

Thermometers have become known from the state of the art in a wide variety of designs. For example, there are thermometers that use the expansion of a liquid, a gas or a solid with a known coefficient of expansion to measure the temperature. Other thermometers associate the electrical conductivity of a material with the temperature, for example, when resistance elements or thermocouples are used. Pyrometers, on the other hand, use the heat radiation of a substance to determine its temperature. The respective underlying measuring principles have each been described in a large number of publications.

A temperature sensor in the form of a resistive element or a so-called thin-film sensor, in particular a resistance temperature detector (RTD), for example, uses a sensor element provided with connecting wires and applied to a carrier substrate, whereby the rear side of the carrier substrate is usually metallically coated. The sensor elements used are so-called resistor elements, which are given, for example, by platinum elements, which are also commercially available as PT10, PT100 and PT1000 elements.

In case of thermocouples, the temperature is determined by means of a thermoelectric voltage occurring between the thermocouple wires connected at one end and consisting of different materials. For temperature measurement, commonly thermocouples according to DIN standard IES584, for example, thermocouples of type K, J, N, S, R, B, T or E, are used as temperature sensors. But other material pairs, especially those with a measurable Seebeck effect, are also possible.

In certain applications, temperature sensors are arranged in a measuring insert, which in turn is brought into contact with the medium via a protective tube in the form of a thermowell, the protective tube being in physical contact with the fluid.

On the one hand, such thermowells are subject to high loads, in particular when they are exposed to a flowing medium which causes different mechanical forces acting on the protective tube, e.g., shear forces or forces induced by coherent vortex shedding, which can result in vortex induced vibrations (VIV). Vortex shedding in fluid dynamics is known as "Kirmin vortex street" and refers to a repeating pattern of swirling vortices in alternating directions caused by the unsteady separation of flow of a medium around a body, causing the body to vibrate. The closer the frequency of the vibrations is to the natural frequency of the body around which the medium flows, the more the body vibrates.

Moreover, the measuring accuracy of a thermometer is highly dependent on thermal couplings between the respective medium, the process environment and/or the thermometer. In this manner, the prevailing heat flows play a decisive role. A reliable determination of the temperature requires that the thermometer and the medium are in thermal equilibrium for at least a period of time required to determine the temperature. At least for this period of time, the temperature of the thermometer and that of the medium, therefore, should be ideally essentially the same. The reaction of a thermometer to a change in temperature, i.e., the so-called response time of the thermometer, plays a decisive role here, especially if the temperature of the medium changes substantially continuously. In that sense, another problem frequently associated with thermometers comprising a thermowell is related to the response time.

Many different solutions have been presented to reduce the response time and to increase the measuring accuracy of thermometers comprising thermowells. For example, walls of the protective tube are made as small as possible. Another approach relates to improvements of contacts between the measuring insert and thermowell. In this context DE102013114140A1 or DE102014101968A1, e.g., describe the use of additional spring elements to improve the contact between the protection tube and the measuring insert. DE102018111167A1 suggests a coupling unit positioned between the measuring insert and thermowell. WO2014/158393A1 discloses a solid insert configured to removably support the temperature probe within the thermowell and to provide a thermal contact between thermowell and probe.

SUMMARY

Based on the known solutions, it is an object of the present disclosure to provide a measuring insert for use with a thermowell with improved performance. This object is achieved by measuring inserts and thermometers according to the present disclosure.

Regarding the measuring insert, the object underlying the present disclosure is achieved by a measuring insert for determining and/or monitoring a temperature of a medium in a vessel or pipe for insertion into a protective tube which protective tube at least partially protrudes into an inner volume of the vessel or pipe, the measuring insert comprising an elongated tube and a temperature sensor arranged inside an end region of the measuring insert. The elongated tube, e.g., can further comprise connecting wires for establishing an electrical connection with the temperature sensor. Moreover, the elongated tube may be filled with a filling material.

According to the present disclosure, the measuring insert further comprises a coupling element connected to the elongated tube in the end region in which the temperature sensor is arranged, which coupling element is embodied and/or dimensioned so as to serve for fixing the measuring insert inside the protective tube in a state in which the measuring insert is introduced into the protective tube. The coupling element thus serves for increased mechanical stability of the measuring insert when introduced into the protective tube and furthermore serves for reduced sensitivity to mechanical vibrations of the thermometer. By means of the coupling element, a gap between an outer wall of the measuring insert and an inner wall of the protective tube is reduced.

In at least one embodiment, the coupling element is at least partially composed of a thermally conductive material. Conventionally, the gap between the walls of measuring insert and protective tube without a coupling element is filled by air which is a poor heat conductor. The coupling element at least partially reduces or minimizes this gap. By providing a coupling element at least partially being composed by a metallic material according to eth present disclosure, an increased response time and improved heat transfer can be achieved leading to enhanced measurement accuracy. The coupling element may further be provided with certain dimensions or geometries which are chosen so as to improve heat transfer, mechanical stability and/or reducing vibrations.

In at least one embodiment, the coupling element comprises a first and a second component, the first component being at least partially rigid and the second component being at least partially elastic. Additionally, the two components may further have different thermal conductivities and/or thermal expansion coefficients. The rigid component serves for mechanical stabilization, and the second component improves the fitting of the measuring insert inside the protective tube. Providing a coupling element made of two components thus improves the fitting performance of the measuring insert inside the protective tube.

In at least one embodiment, the coupling element comprises at least one at least partially elastic and/or deformable element. The elastic and/or deformable element can be the second component of the previously described embodiment or another element or component of the coupling element. In this regard, it is of advantage if the at least one at least partially elastic and/or deformable element is a, in particular metallic, mesh or a metallic foam. It is further of advantage if the at least one at least partially elastic and/or deformable element is a, in particular metallic, spring element.

The coupling element can also comprise a, in particular metallic, mesh or a metallic foam and a, in particular metallic, spring element. With respect to the spring element, it is of advantage if the spring element is embodied such that a spring travel of the spring element is perpendicular to a longitudinal axis of the measuring insert. It is further of advantage if the spring element comprises a plurality of outward curved bars and at least one ring-shaped connection element, to which the plurality of bars is connected, in particular wherein the bars are evenly distributed around the circumference of the connection element.

In further embodiments, the coupling element further comprises a filling material, for example, a powder at least partially comprising carbon, in particular a graphite powder, or a paste. The powder or the paste may preferably be added to the, in particular metallic, mesh or metallic foam, or to the spring element. The powder or paste serves to fill remaining gaps in an area of the coupling element. If the coupling element comprises at least one at least partially elastic and/or deformable element, it becomes possible to fill gaps while maintaining elasticity.

The coupling element may be connected to the measuring insert by means of a force-fit and/or form-fit connection, in particular, wherein the coupling element is connected on the measuring insert by means of a braze or a solder connection. In that way, the coupling element is fixedly connected to the measuring insert.

In at least one embodiment, the coupling element comprises fastening means for fastening the coupling element to the measuring insert. In this regard, it is of advantage if the fastening means comprise a ring element having an inner diameter corresponding to an outer diameter of the measuring insert.

It shall be noted that also existing measuring inserts can be retrofitted with a coupling element as described above, e.g., by fastening such a coupling element to the measuring insert. It shall be further noted that the embodiments described can be combined with each other arbitrarily.

The object underlying the present disclosure is also achieved by means of a thermometer for determining and/or monitoring a temperature of a medium in a vessel or pipe comprising a measuring insert according to the present disclosure.

The thermometer may further comprise a measuring transducer which may be arranged with the measuring insert or separately from the measuring insert. The transducer may serve for processing at least the temperature of the medium determined by the measuring insert.

BRIEF DESCRIPTION OF THE DRAWINGS

In the following, the present disclosure will be explained in greater detail based on the drawings presented, which include:

FIGS. 4a-4c show several embodiments of a spring element according to the present disclosure.

In the figures, identical elements are always provided with the same reference sign.

DETAILED DESCRIPTION

Figure 1:
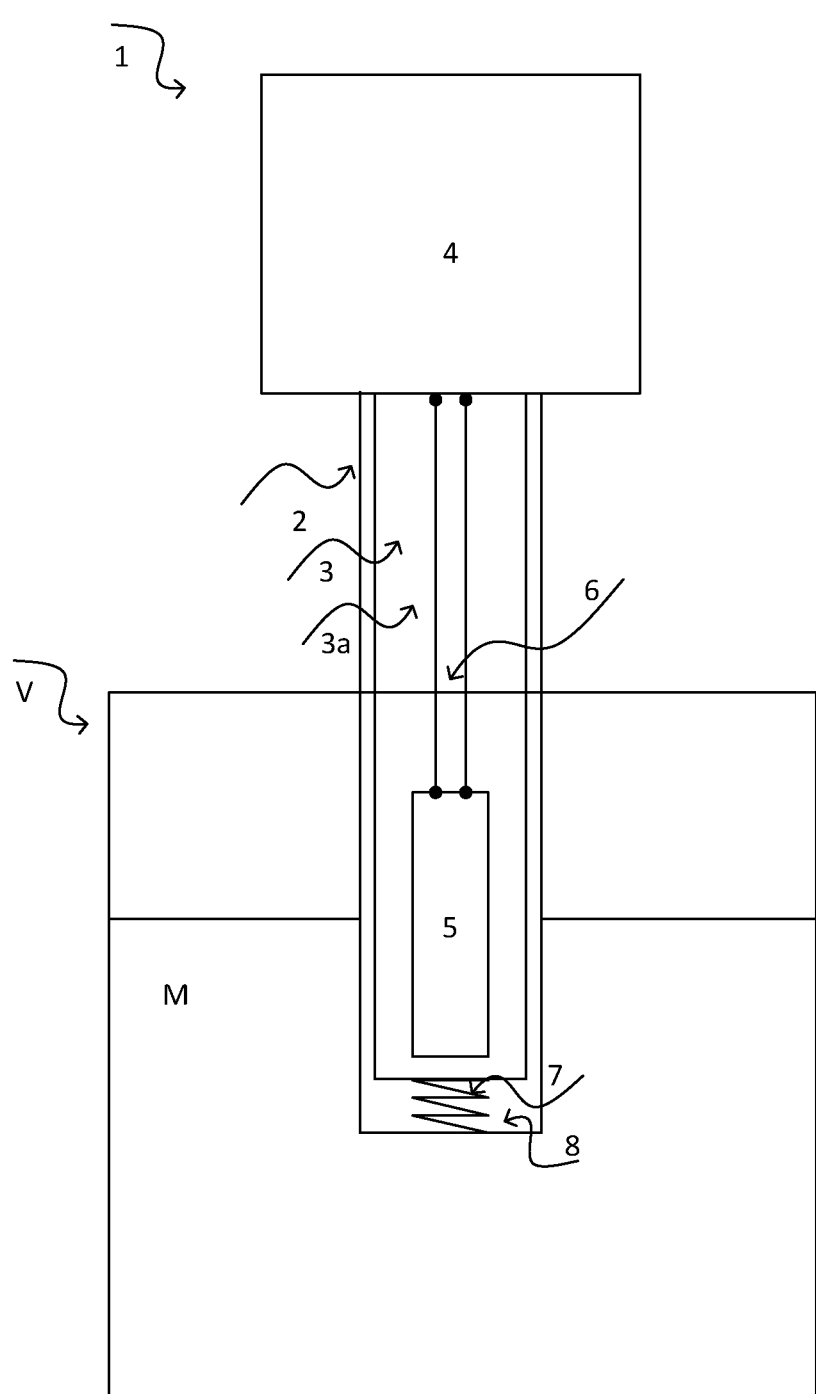
FIG. 1 shows a thermometer comprising a measuring insert and a protective tube according to the state of the art.

FIG. 1 shows a schematic diagram of a state of the art thermometer 1 for determining the temperature T of a medium M in a vessel V, the thermometer 1 comprising a protective tube 2, a measuring insert 3 and electronics 4. The measuring insert 3 is inserted into the protective tube 2 and comprises an elongated tube 3a in which temperature sensor 5, here in the form of a resistive element, is arranged. In certain embodiments, the temperature sensor, e.g., comprises a thermocouple of a resistive element. The temperature sensor 5 is electrically contacted via the connection lines 6 and connected to the electronics 4. In other embodiments, the electronics 4 can also be arranged separately from the measuring insert 3 and protective tube 2. Also, the temperature sensor 5 does not necessarily need to be a resistive element, or the number of connecting lines 6 used need not necessarily be two. Rather, a different number of connecting lines 6 can be used depending on the measuring principle applied.

To improve thermal contacting a spring element 7 is frequently arranged inside the protective tube 2 and/or a paste 8 is provided in the inner volume V of the thermowell 2. However, that way only insufficient mechanical stability and thermal contacting is achieved. Typically, air gaps between an inner wall of the thermowell 2 and an outer wall of the measuring insert 3 are not sufficiently minimized. This results in higher response times of the thermometer 1, less mechanical stability and a certain sensitivity towards vibrations.

Figure 2A:
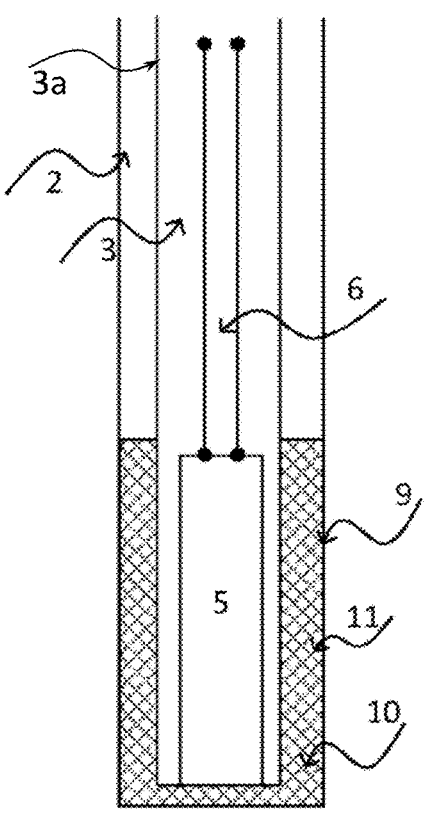
FIGS. 2a and 2b show embodiments of a measuring insert with a coupling element comprising an elastic and/or deformable element in the form of a foam according to the present disclosure.
Figure 2B:
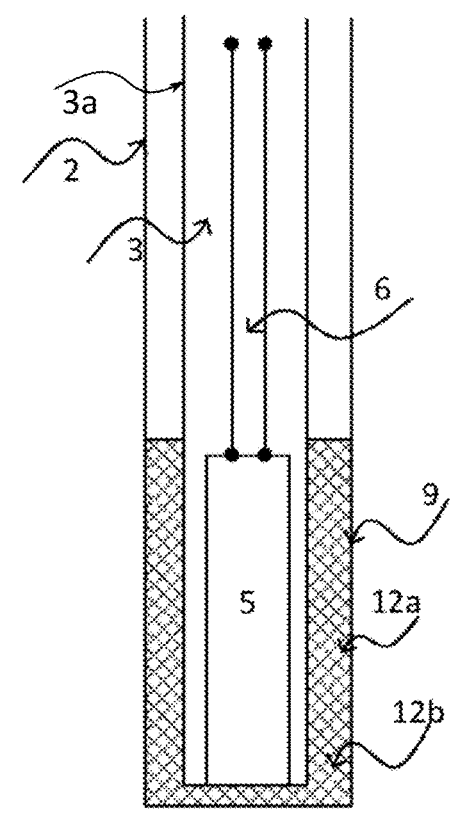

The present disclosure addresses these problems by providing a coupling element 9. Exemplary embodiments of a measuring insert 3 comprising a coupling element 9 are shown in FIGS. 2a and 2b. The coupling element 9 is connected to the elongated tube 3a in the end region in which the temperature sensor 5 is arranged and is embodied and/or dimensioned so as to serve for fixing the measuring insert 3 inside the protective tube 2 when inserted therein. Further, that way a sensitivity of the thermometer 1 to mechanical vibrations can also be highly reduced.

In certain embodiments, the coupling element 9 is at least partially composed of a thermally conductive material, e.g., a metal. Such an embodiment results in an improved performance of the thermometer 1. In particular, a response time of the thermometer 1 in response to a change of the temperature T of the medium M is significantly reduced.

In case of the embodiment shown in FIG. 2a, the coupling element 9 comprises at least one at least partially elastic and/or deformable element in the form of, for example, a metallic, foam 10, which may be connected to the elongated tube 3a. The coupling element 9 may further comprise a filling material 11 filled into remaining gaps in the foam 10. The elastic and/or deformable element can also be, for example, a metallic, mesh.

As illustrated in FIG. 2b, the coupling element 9 may further also comprise at least two different components 12 serving different purposes, e.g., one rigid component 12a and one elastic component 12b. For example, the coupling element 9 in such that the second, elastic component 12b is provided by the elastic and/or deformable element, e.g., a foam or mesh 10, and the first component 12a, e.g., in the form of a rigid frame.

Examples for preferred materials for the coupling element 9 are stainless steel, copper, brass, aluminum or others.

Figure 3:
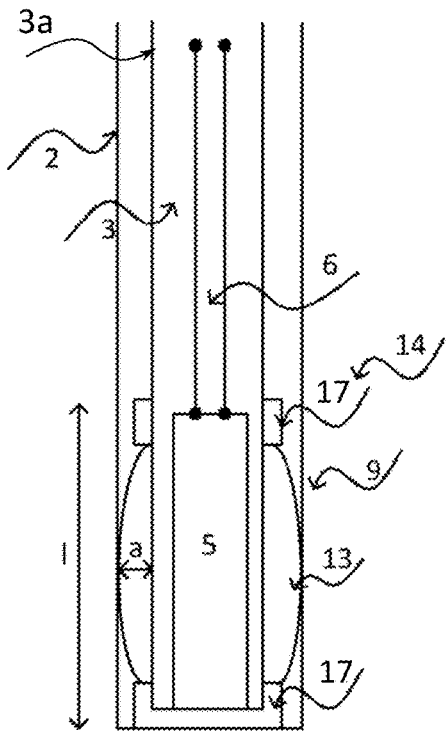
FIG. 3 shows a further embodiment of a measuring insert with a coupling element comprising an elastic and/or deformable element in the form of a spring element according to the present disclosure.

Another embodiment is shown in FIG. 3. Here, the at least partially elastic and/or deformable element is a spring element 13. A spring travel a of the spring element 13 is perpendicular to a longitudinal axis 1 of the measuring insert 3. The coupling element 9 further comprises fastening means 14 with two ring elements 15 connected to the measuring insert 3, here to the elongated tube 3a, in between which the spring element 13 is arranged.

Several embodiments for the spring element 13 are shown in FIGS. 4a-4c. The spring element 13 shown in FIG. 4a comprises a plurality of outward curved bars 15 and two ring-shaped connection elements 16. The bars 15 are clamped and connected between the two connecting elements 16, and evenly distributed around the circumference of the connecting elements 16. The quantity of bars 15 as well as their dimension, e.g., length and width, can vary from one embodiment to another. For instance, in case of the spring element 13 shown in FIG. 4b, the number of bars 15 provided is less as in case of FIG. 4a, but the width of each bar 15 is larger. Moreover, while two connection elements 15 are provided for the embodiment shown in FIG. 4a, the one shown in FIG. 4b comprises one connecting element 16. Another embodiment of a spring element 13 is subject to FIG. 4c. Here, three connection elements 16 are provided, whereas bars 15 are provided in each case between two adjacent connecting elements 16.

Figure 5:
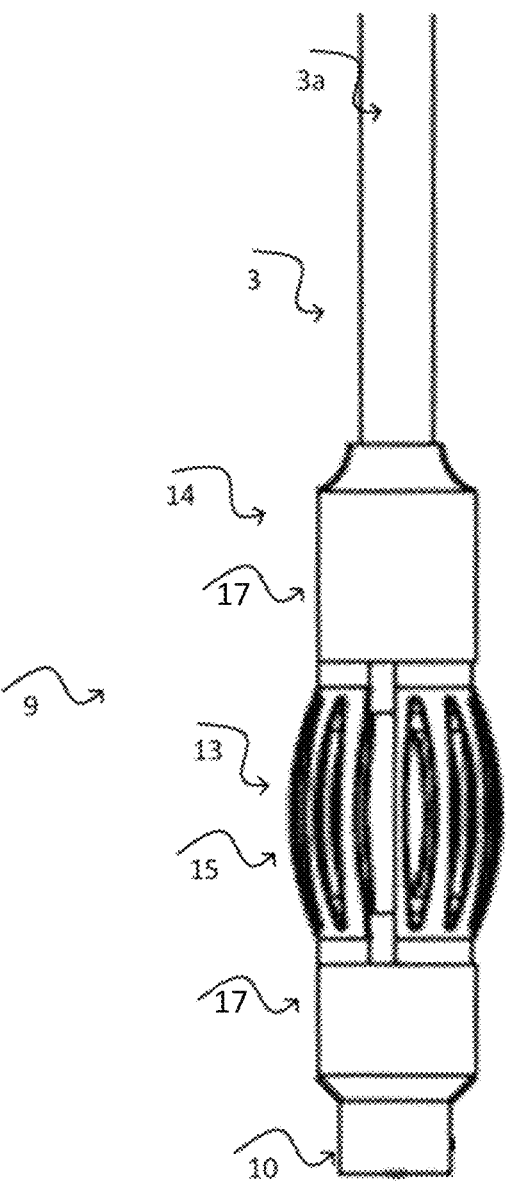
FIG. 5 shows an embodiment with a coupling element comprising a spring element and a mesh according to the present disclosure.

Another embodiment is presented in FIG. 5. The coupling element 9 is arranged in the end region of the elongated tube 3a of the measuring insert 3. The coupling element 9 comprises a spring element 13 connected by the fastening means 14 in the form of two ring shaped elements 15 similar, as in the embodiment shown in FIG. 3. Moreover, a mesh 10 is provided at the tip of the elongated tube 3a. That way, the coupling element 9 comprises a mesh 10 and a spring element 13. Alternatively, a metallic foam can be provided instead of the mesh 10.

We claim:

1. A measuring insert for introduction into a protective tube for determining and/or monitoring a temperature of a medium in a vessel or pipe, which protective tube is configured to at least partially protrude into an inner volume of the vessel or pipe, the measuring insert comprising:
   an elongated tube having a distal end region;
   a temperature sensor comprising a resistive element or a thermocouple and disposed within the distal end region of the elongated tube;
   connection lines adapted for electrically contacting the temperature sensor; and
   a coupling element connected to the elongated tube in the distal end region in which the temperature sensor is disposed, which coupling element is configured so as to fix the measuring insert inside the protective tube in a state when the measuring insert is introduced into the protective tube,
   wherein the coupling element includes a metallic spring element as a first at least partially elastic and/or elastically deformable element, wherein the spring element comprises:
   a plurality of outward curved bars; and
   at least one ring-shaped connection element to which the plurality of bars is connected;
   wherein the coupling element further includes a fastening means configured to fasten the coupling element to the elongated tube, the fastening means including a ring-shaped fastening element having a fixed inner diameter, which corresponds to an outer diameter of the elongated tube, and
   wherein the coupling element is at least partially composed of a thermally conductive material.

2. The measuring insert of claim 1, wherein the coupling element includes a metallic mesh or a metallic foam as a second at least partially elastically deformable element.

3. The measuring insert of claim 1, wherein the spring element is configured such that a spring travel of the spring element is perpendicular to a longitudinal axis of the elongated tube.

4. The measuring insert of claim 1, wherein the plurality of curved bars are evenly distributed around a circumference of the connection element.

5. The measuring insert of claim 1, wherein the coupling element is connected to the elongated tube by a force-fit and/or form-fit connection.

6. The measuring insert of claim 1, wherein the coupling element is connected to the elongated tube by a braze or a solder connection.

7. The measuring insert of claim 1, wherein the coupling element further comprises a filling material distributed about the spring element to fill gaps in the coupling element, wherein the filling material is a powder or a paste.

8. The measuring insert of claim 7, wherein the powder is a graphite powder.

9. A thermometer for determining and/or monitoring a temperature of a medium in a vessel or pipe comprising:
   the measuring insert according to claim 1; and
   the protective tube configured to at least partially protrude into the inner volume of the vessel or the pipe, wherein the measuring insert is disposed within the protective tube and connected thereto by the coupling element.

10. The thermometer of claim 9, further comprising electronics connected to the temperature sensor via the connection lines and configured to determine and/or monitor the temperature of the medium.

11. The thermometer of claim 9, further comprising electronics in communication with the temperature sensor and configured to determine and/or monitor the temperature of the medium.

* * * * *